Sept. 2, 1924.  
B. F. FREEBLE  
1,507,370
ASH TRAY AND LIKE STRUCTURE
Filed Nov. 30, 1923
FIG. I.
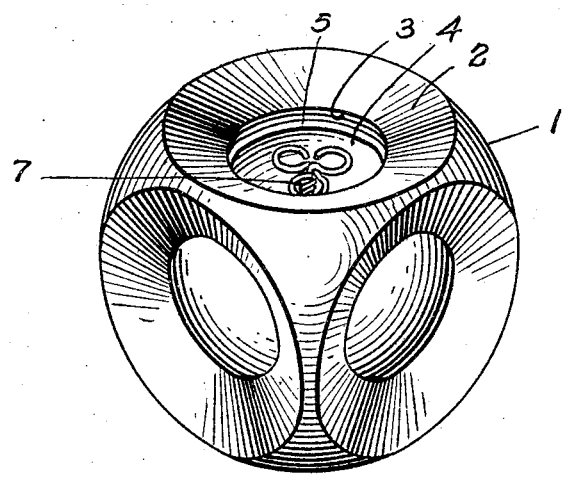
FIG. II.
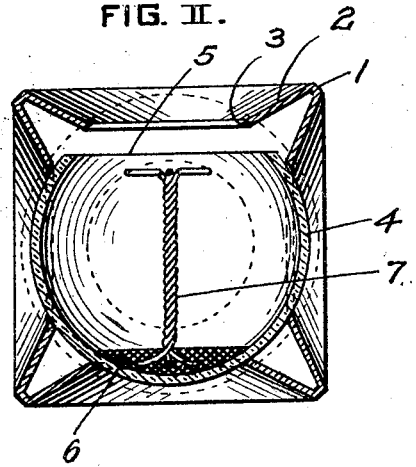
WITNESSES  
J. Herbert Bradley  
Percy A. English
INVENTOR  
Benjamin F. Freeble,  
by Christy and Christy  
his attorneys Patented Sept. 2, 1924.

1,507,370

UNITED STATES PATENT OFFICE.

BENJAMIN F. FREEBLE, OF JAMAICA, NEW YORK, ASSIGNOR TO SEWICKLEY ELECTRIC MANUFACTURING COMPANY, OF SEWICKLEY, PENNSYLVANIA, A CORPORATION OF DELAWARE.

ASH TRAY AND LIKE STRUCTURE.

Application filed November 30, 1923. Serial No. 677,689.

*To all whom it may concern:*

Be it known that I, BENJAMIN F. FREEBLE, residing at Jamaica, in the county of Queens and State of New York, a citizen of the United States, have invented or discovered certain new and useful Improvements in Ash Trays and like Structures, of which improvements the following is a specification.

My invention relates to improvements in ash trays and like structures, and consists in such a structure of simple construction and of attractive appearance, and having the property of tumbling, that is to say of displacement on a level surface, such as a table-top, without spilling. It is illustrated in the accompanying drawings, in which Figure I is a view of the article in perspective, and Figure II is a view of it in vertical and medial plane.

The ash tray consists of two parts, an outer casing and an inner receptacle. The outer casing is preferably formed of metal, and the inner receptacle of glass.

As best seen in Figure I the outer casing 1 is essentially spherical in form, but the sphere is truncated in planes corresponding to the surface planes of a regular polyhedron (in this case a cube) concentric with the sphere.

Throughout these six planes the substance of the casing (which is of thin metal) is deflected from the spherical shape which it otherwise possesses, to form funnel-like rings 2 converging inwardly toward the center of the sphere. These funnel-like inward extensions in turn are truncated, to form orifices 3. These funnel-shaped portions 2 being equal in extent and equally truncated, their edges lie as will best be perceived in Figure II, substantially in a common spherical surface. The edges are advantageously beveled in planes substantially tangent to that spherical surface.

The inner receptacle 4 is made of glass, and is essentially spherical, and of such size as to be slightly less in diameter than the spherical surface defined by the edges 3 of the funnels 2. The essentially spherical receptacle 4 is segmented in one plane, as indicated at 5, forming an opening somewhat greater in diameter than the openings 3 in the funnels, and constituting the inner receptacle a cup.

The casing 1 is preferably made in two or more parts, to the end that in manufacture the parts may be brought together about the spherical receptacle 4 introduced between and then united, by welding or otherwise. When the casing parts are so united the spherical receptacle 4 manifestly is rotatable within the spherical space defined by the edges 3 of the case.

My present invention is an improvement upon that disclosed in Letters Patent No. 985,520, granted me February 28, 1911. The structure there contemplated was a cuspidor; the casing was essentially cubical in form; the material contemplated for the casing was sheet metal of relatively great hardness, and within the casing special members were additionally provided, to constitute bearings upon which the inner receptacle was rotatably borne. The casing of the ash tray of my present invention is essentially spherical in form, and that with the advantage already alluded to; the casing is preferably formed of a plurality of die-cast parts, united about the inner receptacle and like die-castings generally it is preferably formed of relatively soft metal, such as a zinc alloy. The inner receptacle is preferably formed of glass, and, because glass is a much harder substance than the metal of the die-cast casing, it becomes possible to dispense with the special bearing members of my earlier patent, and to cause the receptacle to be borne by the edges 3 of the funnel-shaped parts 2 of the casing. These edges constitute the sufficient bearings for the glass cup rotatable within. In such a construction the accuracy of formation is not so minute as to give a close and continuous bearing between the glass receptacle and the edges 3 of the casing, but the bearing will be at discontinuous points of contact. Under such conditions the friction will be slight and rotation of the spherical receptacle will be easily effected under slight strain. I have said that the edges 3 of the casing may be beveled and may extend in planes tangent to the spherical surface which they in assembly define. It need not be so. The invention is realized in a structure in which these edges support the inner cup.

The cup or receptacle 4 is eccentrically weighted and its center of gravity lies opposite the orifice 5. This is conveniently accomplished by securing a slug 6 of lead or other suitable material to the inner surface of the receptacle by any suitable means, as by gluing it thereto with water-glass. Molded into the substance of slug 6 is the foot of a stand 7 which rises to suitable proximity to the opening 5 so that it may support a cigarette laid in the adjacent and upwardly disposed funnel-shaped depression 2.

It will be perceived that the spherical cup 4, being freely rotatable within the bearings defined, and being weighted as described, will tend always to stand in vertical position with its mouth uppermost. It will be perceived that the essentially spherical casing will roll freely on its spherical surface, and will inevitably tip and fall, so that it will rest with one of its funnels down and its opposite funnel up, as illustrated in Figure II, and that when it comes to rest the spherical container 4 will be in the upright position shown in Figure II.

I do not mean to limit myself to particular materials, but by way of illustration I add that in the embodiment of the invention which I have worked out the casing is made of an alloy of the following composition: zinc, 90%; tin, 5%; copper, 3%; aluminum, 2%.

The casing 1 and the receptacle 4 may be harmoniously colored and the effect may be heightened if the glass be transparent or translucent. The sides of the receptacle 4 visible when the article is at rest through the lateral funnel openings may bear any desired design,—advertising matter, for example. In a particular ash tray made in embodiment of my invention the glass receptacle 4 is translucent and of primrose yellow color. The casing is painted over its exposed surfaces with paint of bronze-green color.

I have described my invention as embodied in an ash tray. Manifestly, the particular use to which the article is put is accidental to the invention, which lies in structure. In the ensuing claims I mean to include under the term, "an ash tray or like structure," any utensil of the same class for which the invention may advantageously be adopted.

I claim as my invention:

1. In an ash-tray or like structure the combination of a casing and a receptacle, the casing being thin-walled and of essentially spherical form, the continuity of the sphere being interrupted over segmental planes which correspond to the faces of a concentric polyhedron, and the casing wall being there modified in shape, to form inwardly leading open-bottomed funnels, the edges of all of the funnels lying in a common spherical surface, the said receptacle being of essentially spherical form, hollow, and segmented on one plane to form an open-mouthed cup, and the said cup resting on and borne by the edges of the funnels formed in the casing and being rotatable on the bearings which the said edges afford, the center of gravity of said cup lying eccentrically on the side of its spherical center opposite the mouth thereof.

2. In an ash-tray or like structure the combination of a casing and a receptacle, the casing being thin-walled and of essentially spherical form, the continuity of the sphere being interrupted over segmental planes which correspond to the faces of a concentric polyhedron, and the casing wall being there modified in shape, to form inwardly leading open-bottomed funnels, the edges of all of the funnels being bevelled to surfaces tangent to a common spherical surface, the said receptacle being of essentially spherical form, hollow, and segmented on one plane to form an open-mouthed cup, and borne within the casing and resting upon the said beveled edges of the funnels and rotatable in such bearing, the center of gravity of said cup lying eccentrically on the side of its spherical center opposite the mouth thereof.

In testimony whereof I have hereunto set my hand.

BENJAMIN F. FREEBLE.

Witnesses:
PERCY A. ENGLISH,
FRIEDA E. WOLFF O'BRIEN.